D. W. SMITH.
GRAIN HARVESTER.
APPLICATION FILED SEPT. 10, 1909.

958,331.

Patented May 17, 1910.
3 SHEETS—SHEET 1.

Witnesses:
F. W. Hoffmeister
Thos. E. Kiely

Inventor
Daniel W. Smith
By E. W. Burgess
Attorney

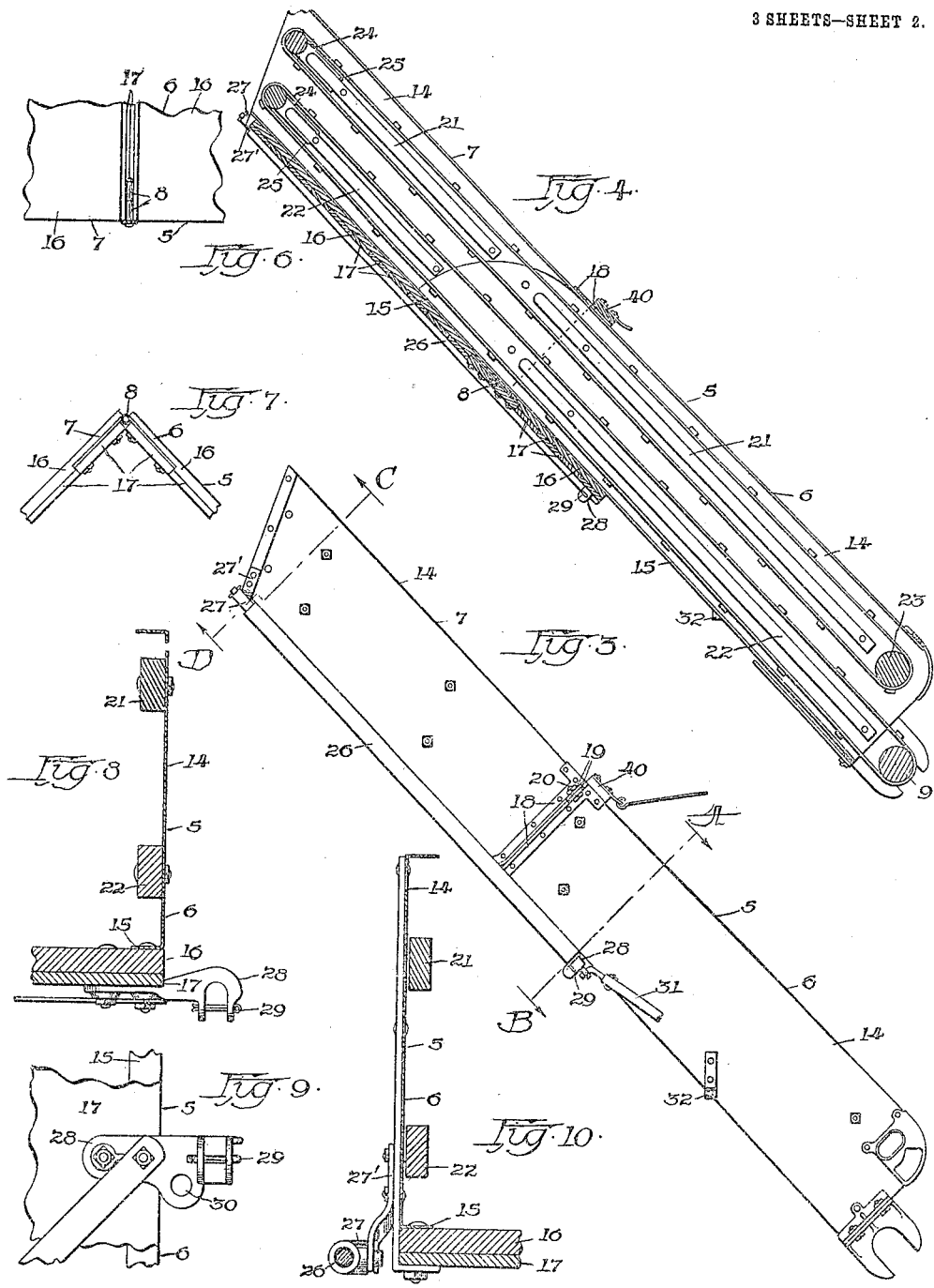

D. W. SMITH.
GRAIN HARVESTER.
APPLICATION FILED SEPT. 10, 1909.
958,331.
Patented May 17, 1910.
3 SHEETS—SHEET 3.
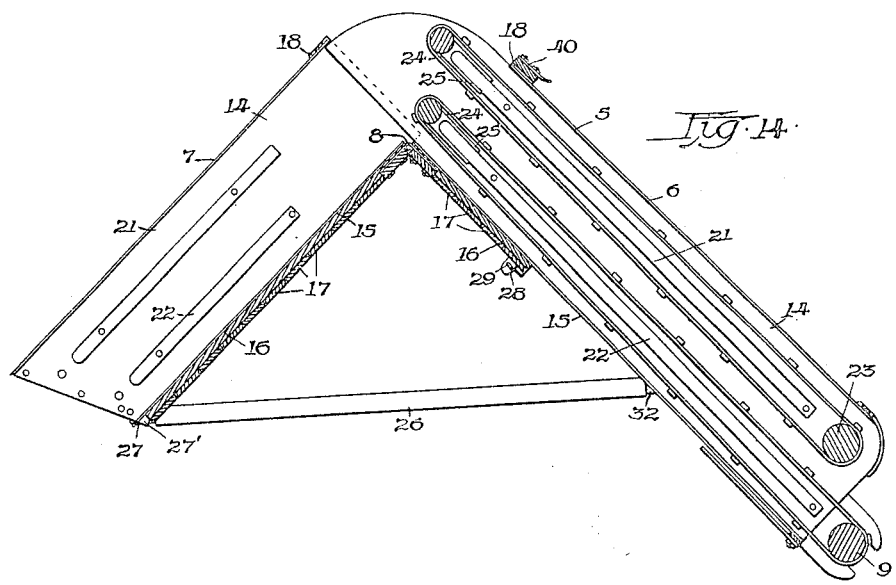
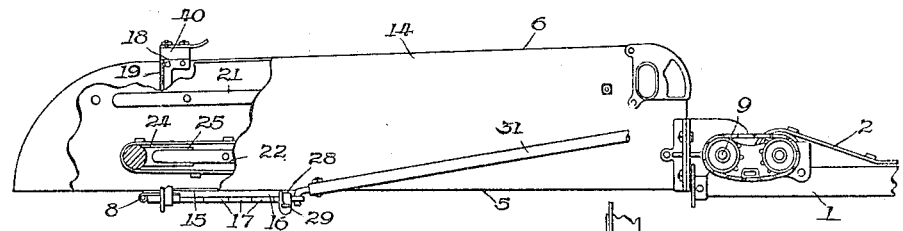
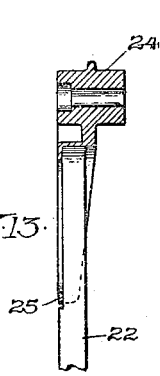
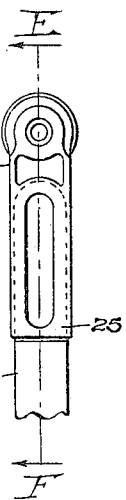
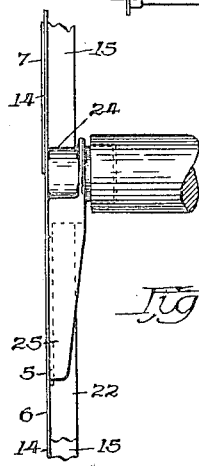
Witnesses:
F. W. Hoffmeister
Thos. Kiely
Inventor:
Daniel W. Smith
By E. W. Burgess
Attorney

UNITED STATES PATENT OFFICE.

DANIEL W. SMITH, OF CHICAGO, ILLINOIS, ASSIGNOR TO INTERNATIONAL HARVESTER COMPANY, A CORPORATION OF NEW JERSEY.

GRAIN-HARVESTER.

958,331.      Specification of Letters Patent.      Patented May 17, 1910.

Application filed September 10, 1909. Serial No. 516,998.

*To all whom it may concern:*

Be it known that I, DANIEL W. SMITH, a citizen of the United States, residing at Chicago, in the county of Cook and State of Illinois, have invented certain new and useful Improvements in Grain-Harvesters, of which the following is a specification.

My invention relates to grain harvesters of the header type, and consists in an attachment for a harvester that may be readily adjusted in a manner to operate either as a grain elevator to conduct the grain to a suitable receptacle, a swather to deposit it in a continuous swath upon the ground, or a buncher whereby it may be deposited in bunches; the object of my invention being to provide, in a single attachment, mechanism that has heretofore been included in several, and to so construct it that the operator may readily and quickly adjust it to meet the requirements of the various crop conditions. I attain this object by means of the mechanism illustrated by the accompanying drawings, in which—

Figure 2:
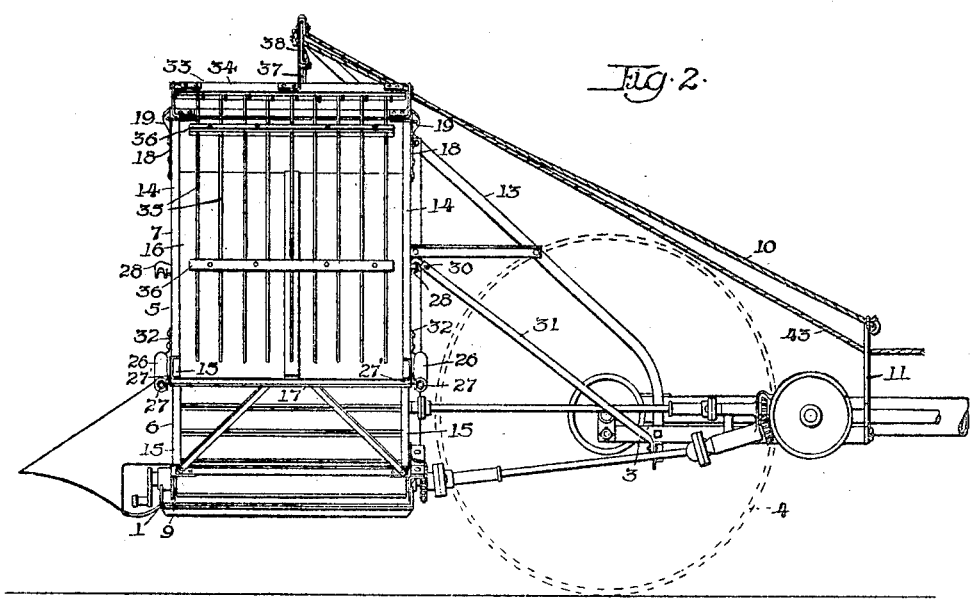
Figure 1:
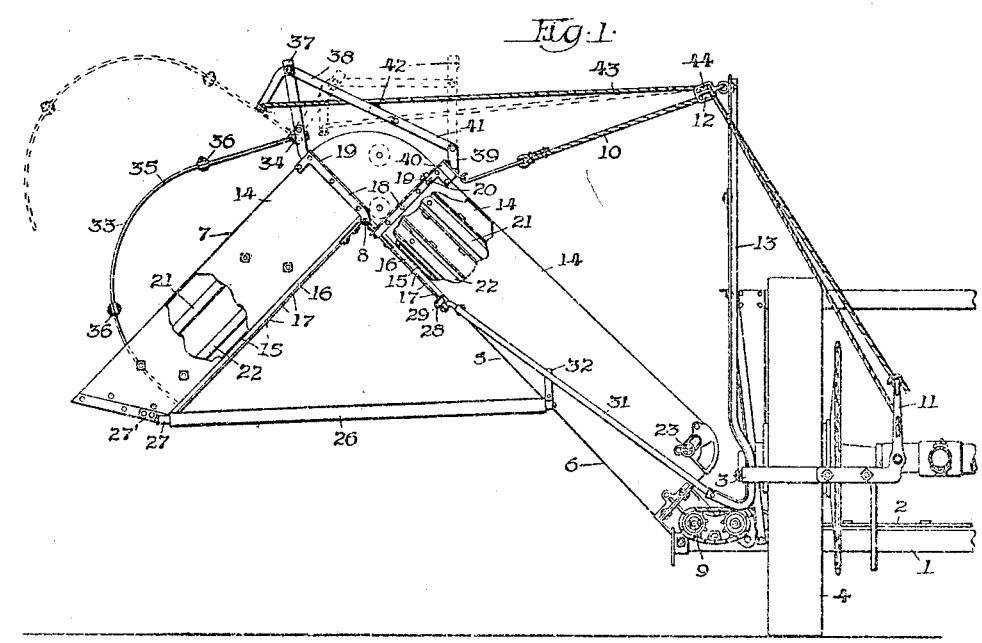

Figure 1 represents a part of a harvester and a front elevation of my invention attached thereto and designed to operate as a buncher for depositing the grain in bunches upon the ground; Fig. 2 is a side elevation of Fig. 1; Fig. 3 represents a detached side view of the attachment with its parts adjusted in a manner whereby it may be operated as an elevator for the purpose of conveying the grain to a receptacle; Fig. 4 is a longitudinal section of Fig. 3; Fig. 5 is a detail representing a side view of the lower member of the two-part elevator frame and designed to show the manner of attaching it to the harvester platform; Fig. 6 is a detail of a hinge joint connection between the two parts of the elevator frame; Fig. 7 is an end view of Fig. 6; Fig. 8 is a detail, partly in section, of part of the elevator frame along line A—B of Fig. 3. Fig. 9 is a bottom view of Fig. 8; Fig. 10 is a detail, partly in section, and designed to show a part of the elevator frame along line C—D of Fig. 3. Fig. 11 is a detached detail of part of an apron guide and a bearing box for the roller; Fig. 12 is a side view of one of the apron guides and bearing boxes for the roller, as shown in Fig. 11 also showing part of one of the side members of the elevator frame, and Fig. 13 represents a longitudinal section along line E—F of Fig. 11. Fig. 14 is a sectional elevation of the elevator shown in Fig. 1, upon a larger scale.

Like reference characters designate the same parts throughout the several views.

1 represents the stubbleward end of a header platform, and 2 an endless apron mounted thereon.

3 is a part of the wheel frame, and 4 one of the carrying wheels.

5 represents a grain elevator having its lower end connected with a header platform and its outer end inclined upward in a stubbleward direction. The elevator is made in two sections, a lower section 6 and an upper section 7, having their adjacent ends connected by means of a hinge joint 8. The lower end of the lower section connects with the stubbleward end of the grain platform of the header in a manner permitting the elevator to be raised or lowered at its outer end about the axis of the carrier roller 9 journaled at he stubbleward end of the platform, the elevation of the elevator at its outer end being controlled by means of a rope 10, having one end connected with the elevator and its opposite end with a fixed part 11 of the machine frame; the sheave 12 being attached to the upper end of the frame member 13, the rope passing around the sheave and having its direction of draft controlled thereby. Each section of the elevator includes side members 14, preferably made of sheet steel, having a portion of their upper and lower edges turned inward, forming longitudinal ribs 15, to which are attached bottom members 16 extending lengthwise of the elevator, and transverse members 17 secured thereto. The connecting ends of the two sections are provided with joint plates 18 having outwardly extending ear portions 19, having openings therein adapted to receive bolts 20 in a manner to retain the two sections in a parallel plane. Secured to the inner surfaces of the side members of each section are longitudinally arranged upper and lower carrier guides 21 and 22, respectively; the carrier roller 23 being journaled at the lower end of the lower section at the ends of the upper guides in a manner to yield upward against the pressure of the grain between the carriers.

24 represents bearing boxes for the carrying rollers at the upper end of the elevator sections. The boxes are provided with socket members 25 that are adapted to loosely receive the ends of the carrier guides, as shown in Figs. 11 and 12, the outer sides of the guides being cut away as shown in Fig. 10. When the two sections of the elevator are adjusted in the same plane, as shown in Figs. 3 and 4, and designed to be used in connection with a traveling rack to receive the grain, the bearing boxes for the upper ends of the elevator carriers are placed upon the outer ends of the carrier guides upon the outer section, as shown in Fig. 4, and 26 represents rollers journaled longitudinally at opposite sides of the upper end of the elevator and at the lower edges thereof and operative as chafing members between the elevator and rack, as is common in this class of machines, the upper ends of the rollers being journaled in boxes 27 that are pivotally connected with brackets 27¹ secured to the elevator sides, as shown in Fig. 10, and their lower ends in box members 28 secured to the bottom of the lower section of the elevator; the bearings for the roller journals being at the bottom and provided with transversely arranged keys 29 for the purpose of retaining the journals in place, as shown in Figs. 8 and 9. The box member upon the rear side of the elevator is provided with an opening 30 adapted to receive the upper hooked end of a brace member 31, having its opposite end pivotally connected with a fixed part of the harvester frame.

When it is desired to operate the attachment for the purpose of depositing the grain in a swath, the elevator sections are adjusted to the position shown in Fig. 1, having the upper section turned downward about its hinge joint connection with the lower section in a plane at right angles with the plane of the lower section, the rollers 26 having their lower journals removed from box members 28 and inserted into eye members 32 secured to the elevator sides intermediate the members 28 and the lower end of the elevator, whereby they are operative as brace members between the upper and lower sections of the elevator, when it is desired to operate the attachment for the purpose of depositing the grain in bunches upon the ground.

The dropper attachment 33 is pivotally mounted upon the inclined outer section of the elevator. The dropper attachment includes a two-part transverse rocking head 34 pivotally mounted upon the elevator frame in a manner to rock about its axis therewith, and having a series of fingers 35 secured at their upper ends between the two parts of the head and curving outward and downward, their opposite ends adapted to contact with the bottom of the elevator, forming a basket-like receptacle for the retention of grain delivered by the endless carrier provided in the other section of the elevator.

36 represents spacing bars secured to the backs of the fingers for the purpose of retaining them in spaced relation. Means for dumping the load retained by the fingers include an upwardly projecting arm 37 secured to the rocking head, a curved lever 38 pivotally connected intermediate its ends with the upper end of the arm 37 and longitudinally arranged relative to the elevator, an arm 39 secured to a transverse bar 40 secured to the upper end of the grainward section of the elevator, a bar 41 having one end pivotally connected with the arm 39 and its opposite end pivotally connected with the grainward end of the curved lever 38, the bar being extended beyond its connection with the lever 38 and having a portion 42 thereof bent laterally in a manner to contact with the upper end of lever 38, the two parts operating as a toggle connection between the fixed arm 39 and the swinging arm 37, the lateral portion of the bar 41 operative as a stop limit of the motion of the toggle mechanism in one direction. A rope 43 is connected with the opposite end of the lever arm 38 and, passing around the sheave 44, is conducted within reach of the operator, who may thereby control the motion of the bunching attachment to or from the dotted line position shown in Fig. 1.

What I claim as my invention, and desire to secure by Letters Patent, is:

1. A harvester elevator including, in combination, two sections hinged together at their adjacent ends, carrier guides secured to each section, carrier rollers, bearing boxes for said carrier rollers, said boxes having socket members adapted to loosely receive the ends of said guides at the delivery end of either section.

2. A harvester elevator including, in combination, two sections hinged together at their adjacent ends, carrier guides secured to each section, carrier rollers, bearing boxes for said carrier rollers, said boxes having socket members, said guides having a cutaway portion at the delivery end of each section adapted to loosely receive said socket members.

3. A harvester elevator including, in combination, two sections hinged together at their adjacent ends whereby they may be arranged in the same plane or at an angle to each other, chafing members, means for mounting said chafing members longitudinally along the bottom of said sections when they are arranged in the same planes, and means whereby said chafing members may be operative as brace members between said sections when they are arranged at an angle to each other.

4. A harvester elevator including, in combination, two sections hinged together at their adjacent ends, carrier guides secured to each section, carrier rollers, bearing boxes for said carrier rollers, the outer ends of said carrier guides being adapted to loosely receive said bearing boxes.

DANIEL W. SMITH.

Witnesses:
  CAS. GEZEGORZEWSKI,
  ELTON B. ROGERS.